United States Patent Office 3,038,011
Patented June 5, 1962

1

3,038,011
1,1,1,7,7,7-HEXANITROHEPTANONE-4
Pliny O. Tawney, Passaic, N.J., assignor to United States Rubber Company, New York, N.Y., a corporation of New Jersey
No Drawing. Filed Feb. 14, 1951, Ser. No. 210,995
1 Claim. (Cl. 260—593)

This invention relates to a new compound 1,1,1,7,7,7-hexanitroheptanone-4. This new compound is potentially useful as an explosive and/or propellant.

The said new compound is made by reacting trinitromethane with divinylketone. The latter compound, made by dehydrochlorination of 1,5-dichloropentanone-3, is preferably mixed as soon as possible, because of its extreme ease of polymerization, with an excess of trinitromethane in a suitable mutual solvent. Upon standing for several hours, the crystalline product is separated conveniently by filtration.

The reactions take place as follows:

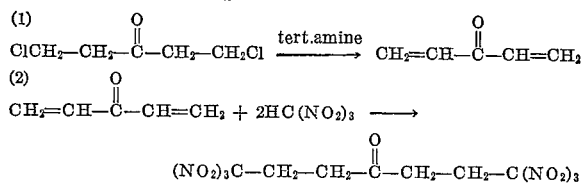

The 1,1,1,7,7,7-hexanitroheptanone has a melting point of 120° C., an ideal temperature for filling and storage of shells containing it. A material which melts below about 75° C. often has its melting point so depressed by impurities or other ingredients deliberately added to it that the mixture liquifies in hot weather, thereby expanding and possibly leaking from the shell unless special precautions are taken. A material melting above about 150° C. is more difficult to load into a shell because it is not practical to load the shell with the molten material, thus requiring grinding of the solid material and thorough mixing with any other ingredients in order to attain reproducibility of the propellant and explosive characteristics. Such grinding operation often is extremely hazardous or even impossible because of the explosive nature of the material.

The following example discloses a method for making my new compound. All parts are by weight.

Example

Twelve parts (0.084 mol) of 1,5-dichloropentanone-3, made as described by Catch et al. (J. Chem. Soc., 278, 1948), were heated to 100° C. in an oil bath, the outlet of the reaction flask being attached to a cold trap and the entire system being evacuated to a pressure of 15 mm. Hg. Twenty parts (0.168 mol) of tri-n-amylamine were added dropwise during about an hour, and heating was then continued for a sufficient time to complete the reaction, i.e., usually about 2 hours. The divinyl ketone, which had distilled into the cold trap as fast as it was formed, was dissolved in a petroleum ether fraction (largely n-hexane) and added to an excess of trinitromethane. After standing for several hours at room temperature the crystals which had formed were filtered and leached with warm water to remove small amounts of trinitromethane-tri-n-amylamine salt. The crude 1,1,1,7,7,7-hexanitroheptanone-4 was recrystallized from a methanol-water solution, thereby yielding 3 parts of the said compound in the form of a white solid melting at 120° C. It is detonated by a hammer blow. Oxygen balance —21.

Analysis.—Calculated for $C_7H_8N_6O_{13}$, 21.9% nitrogen. Found, 21.1% nitrogen.

I claim:
1,1,1,7,7,7-Hexanitroheptanone-4.

No references cited.